United States Patent [19]
Flanagan et al.

[11] Patent Number: 5,400,237
[45] Date of Patent: Mar. 21, 1995

[54] PWM INVERTER CONTROLLER WITH WAVEFORM MEMORY

[75] Inventors: David F. Flanagan, Santa Barbara; Keith E. Iholts, Ventura; John R. Lindbery, Santa Barbara, all of Calif.

[73] Assignee: Simmonds Precision Products, Inc., Akron, Ohio

[21] Appl. No.: 880,875

[22] Filed: May 11, 1992

[51] Int. Cl.⁶ .......................................... H02M 1/12
[52] U.S. Cl. ..................................... 363/41; 363/37; 363/95
[58] Field of Search ................... 363/17, 28, 37, 41, 363/95, 96, 98, 132, 136, 137; 318/254, 599

[56] References Cited

U.S. PATENT DOCUMENTS

| | | | |
|---|---|---|---|
| 4,067,057 | 1/1978 | Taddeo et al. | 363/41 |
| 4,099,109 | 7/1978 | Abbondanti | 318/227 |
| 4,227,138 | 10/1980 | Espelage et al. | 318/802 |
| 4,409,534 | 10/1983 | Bose | 318/811 |
| 4,520,437 | 5/1985 | Boettcher, Jr. et al. | 363/41 |
| 4,527,226 | 7/1985 | Glennon | 363/41 |
| 4,595,976 | 6/1986 | Parro | 363/41 |
| 4,730,242 | 3/1988 | Divan | 363/37 |
| 4,740,891 | 4/1988 | Kirkpatrick | 364/200 |
| 4,748,552 | 5/1988 | Seino | 364/140 |
| 4,748,553 | 5/1988 | Itoh et al. | 364/140 |
| 4,823,251 | 4/1989 | Kawabata et al. | 363/95 |
| 4,860,186 | 8/1989 | Maekawa et al. | 363/41 |
| 4,870,556 | 9/1989 | Inaba et al. | 363/41 |
| 4,922,400 | 5/1990 | Cook | 363/37 |
| 4,935,684 | 6/1990 | Watanabe | 318/729 |
| 4,954,726 | 9/1990 | Lipman et al. | 307/46 |
| 4,977,492 | 12/1990 | Kirchberg, Jr. et al. | 363/41 |
| 4,992,920 | 2/1992 | Davis | 363/36 |
| 4,994,950 | 2/1991 | Gritter | 363/41 |
| 5,001,619 | 3/1991 | Nakajima et al. | 363/41 |
| 5,001,622 | 3/1991 | Kirchberg et al. | 363/95 |
| 5,168,439 | 12/1992 | Kumar et al. | 363/95 |

OTHER PUBLICATIONS

"Regular-Sampled PWM Techniques Minimize Harmonics–Part II: Harmonic Elimination", PCIM, May 1991, pp. 24–32.

Addoweesh, E. D. and Mohamaein, A. L., "Microprocessor Based Harmonic Elimination in Chopper Type AC Voltage Regulators", IEEE Transactions on Power Electronics vol. 5 No. 2 pp. 191–200, Apr. 1990.

Boost, M. and Ziogas, P. D., "State of the Art PWM Techniques: A Critical Evaluation", IEEE, Jun. 1986, pp. 425–433.

Bowes, S. R., "Regular-Sampled PWM Techniques Minimize Harmonics", PCIM May, 1991, pp. 15–24.

Bowes, S. R. and Midoun, A., "Microprocessor Implementation of New Optimal PWM Switching Strategies", IEE Proceedings vol. 135, Pt.B., No. 5, Sep. 1988, pp. 269–280.

Bowes, S. R. and Midoun, A., "New PWM Switching Strategy for Microprocessor Controlled Inverter Drives", IEE Proceedings vol. 133, Pt.B., No. 4, Jul. 1986, pp. 237–254.

Bowes, S. R. and Mount, M. J., "Microprocessor Control of PWM Inverters", IEE Proc., vol. 128, Pt.B., No.6, Nov., 1981; pp. 293–305.

(List continued on next page.)

Primary Examiner—J. L. Sterrett
Attorney, Agent, or Firm—William E. Zitelli; Mark D. Saralino

[57] ABSTRACT

A programmed PWM controller for controlling an inverter is provided which includes memory means for storing a plurality of drive data words representing a pulsewidth modulation sequence, each drive data word including a driveword and a drivetime word, the drivewords being used to operate the inverter; first digital means for selectively retrieving each of the plurality of drive data words from the memory means according to the pulsewidth modulation sequence in response to a next drive data word request signal; and second digital means governed by the drivetime word for generating the next drive data word request signal.

33 Claims, 5 Drawing Sheets

OTHER PUBLICATIONS

Bowes, S. R. and Clark, P. R., "Transputer Based Harmonic-Elimination PWM Control of Inverter Drives", IEEE, Oct. 1989, pp. 744–752.

Bowes, S. R. and Clark, P. R., "Transputer Based Optimal PWM Control Inverter Drives", IEEE, Oct. 1988, pp. 314–321.

Divan, D. M., "The Resonant DC Link Converter—A New Concept in Static Power Conversion", IEEE, Mar. 1986, pp. 648–656.

Divan, D. M. and Skibinski, G., "Zero Switching Loss Inverters for High Power Applications", IEEE, Feb. 1987, pp. 627–634.

Divan, D. M., Venkataramanan, G. and DeDoncker, R. W., "Design Methodologies for Soft Switched Inverters", IEEE, Oct. 1988, pp. 758–766.

Dwyer, E. and Ooi, B. T., "A Lookup Table Based Microprocessor Controller for a Three Phase PWM Inverter", IECI '79 Proceedings—Industrial Control Applications of Microprocessors Mar. 1979, pp. 19–22.

Enjeti, P. N., Ziogas, P.D. and Lindsay, J. F., "Programmed PWM Techniques to Eliminate Harmonics: A Critical Evaluation", IEEE Transactions on Industry Applications, vol. 26, No. 2, Mar./Apr. 1990, pp. 302–316.

He, J., Mohan, N. and Wold, B., "Zero-Voltage-Switching PWM Inverter for High-Frequency DC-AC Power Conversion", IEEE, May 1990, pp. 1215–1221.

Kato, T., "Precise PWM Waveform Analysis of Inverter for Selected Harmonic Elimination", IEEE, Mar. 1986, pp. 611–616.

Lee, C. O., Liu, R. and Sooksafra, S., "Nonresonant and Resonant Coupled Zero Voltage Switching Converters", IEEE Transactions on Power Electronics, vol. 5 No. 4, Oct. 1990, pp. 404–412.

Liu, K. and Lee, F. C. Y., "Zero–Voltage Switching Technique in DC/DC Converters", IEEE Transactions on Power Electronics, vol. 5 No. 3, Jul. 1990, pp. 293–304.

Malesani, L., Tenti, P., Divan, D. M. and Tiogo, V., "A Synchronized Resonant DC Link Converter for Soft-Switched PWM", IEEE, Oct. 1989, pp. 1037–1044.

Patel, H. S. and Hoft, R. G., "Generalized Techniques of Harmonic Elimination and Voltage Control in Thyristor Inverters: Part I—Harmonic Elimination", IEEE Transactions, 1973, IA-9, May/Jun. 1973, pp. 310–317.

Patel, H. S. and Hoft, R. G., "Gereralized Techniques of Harmonic Elimination and Voltage Control in Thyristor Inverters: Part II Voltage Control Techniques", IEEE Transactions, Sep./Oct. 1974, IA-10, pp. 666–673.

Sone, S. and Hori, Y., "Harmonic Elimination of Microprocessor Controlled PWM Inverter for Electric Traction", IECI '79 Proceedings–Industrial and Control Applications of Microprocessors, Mar. 1979, pp. 278–283.

PWM INVERTER CONTROLLER WITH WAVEFORM MEMORY

TECHNICAL FIELD

The present invention relates generally to an inverter and inverter controller and, more particularly, to a pulse width modulation (PWM) controller for operating an inverter.

BACKGROUND OF THE INVENTION

Inverters and controllers for operating inverters are known in the art. An inverter changes a DC voltage to an AC voltage. Typically this is done by switching the voltage applied to an output line between a positive DC voltage and a negative DC voltage in such a manner as to produce an AC voltage on the output line. Inverters generally provide either a single-phase or three-phase output. A single-phase inverter changes a DC voltage to a single phase AC sinusoidal voltage waveform which has a selected magnitude and frequency. A three-phase inverter has three output lines, and changes a DC voltage into three separate AC sinusoidal voltage waveforms having the same magnitude and frequency but being 120° out of phase.

One method for controlling an inverter is commonly referred to as programmed control. An inverter will typically include a plurality of switches used to switch the output line(s) between a positive and negative DC voltage. The programmed controller stores a predetermined switching pattern in memory. The predetermined switching pattern is then translated into respective gating signals which are applied to the inverter switches when required.

A particular type of programmed control is pulse width modulation (PWM) control and, in particular, harmonic elimination PWM control. As is known, the switching of the output lines between the DC voltages in the inverter often will generate undesirable harmonics in the inverter output. Harmonic elimination PWM control is a theoretical technique for eliminating undesirable harmonics from the output of the inverter. The specific switching patterns for the inverter switches are precalculated using known algorithms, and selected harmonics may be eliminated from the inverter output as a result. For example, the elimination of seven or more of the non-triplen harmonics (i.e., 5th, 7th, 11th, etc.) results in an inverter output with low switching losses and an output waveform having low harmonic content. A detailed description of PWM control is found in Enjeti, et al., *"Programmed PWM Techniques to Eliminate Harmonics: A Critical Evaluation"*, IEEE Trans, on Ind. App., Vol. 26, No. 2 (March/April 1990), and in Patel, et al., *"Generalized Techniques of Harmonic Elimination..."*, IEEE Trans. on Ind. App., Vol. IA-9, No. 3 (May/June 1973) (Part I) and Vol. IA-10, No. 5 (Sept./Oct. 1974) (Part II), the entire disclosures of which are incorporated herein by reference.

When using programmed PWM control, it is necessary to translate the precalculated switching instants into gating signals for the respective inverter switches as is described in the aforementioned "Programmed PWM Techniques..." article. Typically, one cycle of gating signals, i.e., from 0° to 360°, is divided into discrete time intervals based on the desired resolution. Thus, for example, if the output frequency of the inverter is 60 Hz, then each cycle of gating signals would take 16.67 milliseconds (ms). If the desired resolution is 0.0216°, each cycle of gating signals must be divided into 16670 discrete time intervals of 1 microsecond (us) duration. The state ("on" or "off") of the respective inverter switches during each of these time intervals is stored as a gating signal in the memory of the PWM controller. After each discrete time interval (e.g., 1 $\mu$s), a microprocessor included in the PWM controller updates the inverter switch states using the corresponding gating signal data stored in the memory. An example of such a PWM controller is described with respect to FIG. 14 in the above-mentioned "Programmed PWM Techniques..." article.

Despite the many advantages of programmed PWM controllers for operating an inverter, there are several drawbacks associated with the aforementioned PWM controllers. In particular, PWM controllers of the foregoing described type generally require large amounts of memory space and microprocessor time. In the example described above having a desired resolution of 0.0216°, 16,670 memory locations are required to store the gating signals describing the states of the inverter switches corresponding to each discrete time interval. Such a sequence of gating signals and related data is referred to herein as the PWM sequence. Moreover, because the microprocessor may be required to update the gating signal after each time interval, the microprocessor typically spends the majority of its computation time servicing the PWM controller. Thus, the microprocessor typically must be dedicated solely for use with the PWM controller.

Still another drawback associated with existing PWM controllers is that the microprocessor limits the resolution available from the PWM controller. More particularly, the microprocessor is limited with respect to how quickly it can retrieve and update the gating signals in the PWM sequence. If, for example, the microprocessor can update the gating signals no faster than every 15 $\mu$s, the resolution of the PWM controller is limited to 15 $\mu$s. Since the rate at which the PWM inverter controller can update the gating signals is directly proportional to the inverter output frequency, the inverter output frequency is thus limited by the performance limitations of the microprocessor.

As a result, commercially suitable PWM controllers typically require a large amount of memory, require a dedicated microprocessor, and are substantially limited in available resolution by the microprocessor. Moreover, these PWM controllers generally include complex circuitry and are expensive to manufacture.

Commercially, there is a strong need for a PWM controller which does not require an extensive amount of memory storage, which does not require a microprocessor to access the programmed gating signals from memory, and which can provide resolution as high as 320 nanoseconds. Furthermore, there is a strong commercial need for a PWM controller which is simple, inexpensive, and smaller in size than the foregoing described PWM controllers.

With respect to a PWM controller which includes a microprocessor, there is a strong need in the art for a PWM controller having a microprocessor whose computational burden is substantially reduced as compared to existing PWM controllers (i.e., reduced to less than 5% of previous requirements). As a result, a slower microprocessor can be used in the PWM controller to achieve the same output frequency. Alternatively, the same microprocessor used in an existing PWM controller would be free to handle other computational/control matters in a system (e.g., voltage or current regulation for the inverter, status displays, etc.).

SUMMARY OF THE INVENTION

According to one particular aspect of the present invention, a programmed PWM controller for controlling an inverter is provided which includes memory means for storing a plurality of drive data words representing a pulsewidth modulation sequence, each drive data word including a driveword and a drivetime word with the drivewords being used to operate the inverter; first digital means for selectively retrieving each of the plurality of drive data words from the memory means according to the pulsewidth modulation sequence in response to a next drive data word request signal; and second digital means governed by the drivetime word for generating the next drive data word request signal.

According to another aspect of the present invention, a method for providing a pulsewidth modulated (PWM) control to an inverter is provided using a plurality of drive data words stored in memory and which represent a PWM sequence, each drive data word including a driveword and a drivetime word, the method including the steps of selectively retrieving a first of the drive data words from the memory and providing a gating signal to the inverter as a function of the driveword included in the first drive data word comparing the drivetime included in the first of the drive data words with a cycle reference time; and based on such comparing step, selectively retrieving a second of the drive data words from the memory and providing a different gating signal to the inverter as a function of the driveword included in the second drive data word.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE PREFERRED EMBODIMENTS

The present invention will now be described in detail with reference to the drawings in which like reference labels are used to refer to like elements throughout.

Figure 1:
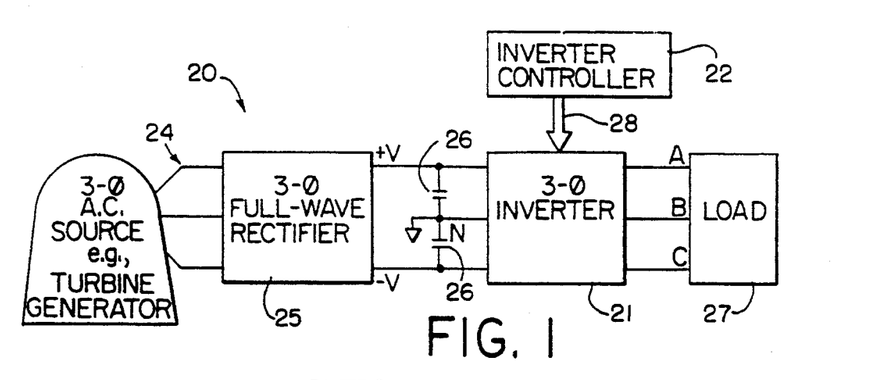
FIG. 1 is a schematic diagram of an energy conversion system including a three-phase inverter and a PWM controller in accordance with the present invention.

Referring initially to FIG. 1, an energy conversion system 20 having an inverter 21 and a PWM controller 22 in accordance with the present invention is shown. The energy conversion system 20 includes a three-phase AC source 23 for providing a three-phase AC output signal on output lines 24. The AC source 23 may be any type of AC source, such as a turbine generator which provides a three-phase AC output signal at approximately a few thousand hertz. The output lines 24 from the AC source 23 are coupled to a conventional three-phase, full-wave rectifier 25 as is shown. The rectifier 25 rectifies the output from the AC source 23 and provides a set of DC line voltages +V, −V and a neutral (N) to the input of the inverter 21. Filter capacitors 26 coupled between the +V and −V lines and the neutral N are included to filter out undesirable line noise and uneliminated harmonic content.

The inverter 21 is operative to change the DC voltages found on the +V, −V and N lines into a three-phase AC output signal on output lines A, B and C. The output of the inverter 21 is delivered to a load 27. The frequency and magnitude of the inverter 21 output are a function of the PWM sequence stored in memory in the PWM controller 22 as will be appreciated. The PWM controller 22 provides a sequence of gating signals, also referred to herein as drivewords, to the inverter 21 via a set of control lines 28. Each respective control line 28 is coupled to the gate of a corresponding inverter switch, and the gating signals provided on the control lines 28 are used to change selectively the state of one or more of the inverter switches in accordance with the PWM sequence in order to generate a three-phase inverter output signal as is explained in more detail below. The control lines 28 may consist of fiber optic cables used to optically turn on and off the inverter switches, or may simply be hard wired to gating circuits of the respective inverter switches.

Although the present invention is described herein in the context of a three-phase system, it will be appreciated that the PWM controller and inverter of the present invention can be used in a single phase system without departing from the scope of the invention.

Figure 2:
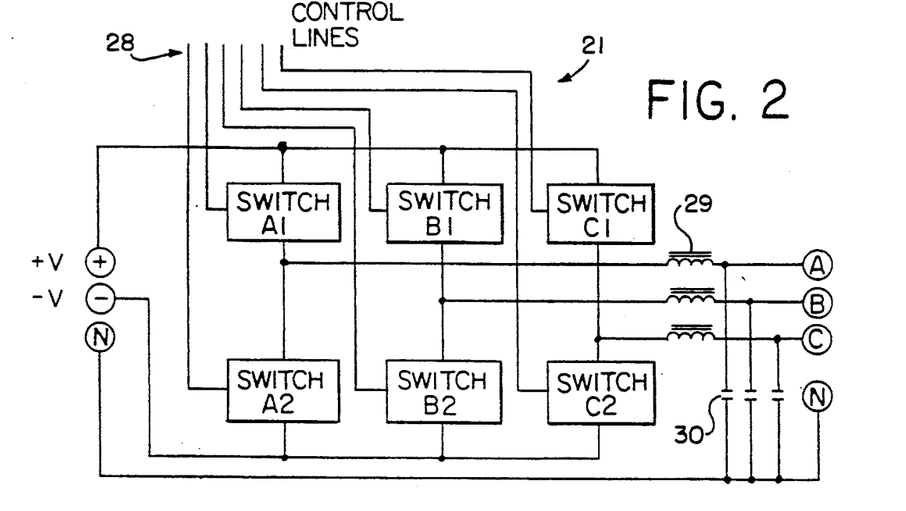
FIG. 2 is a schematic diagram of a three-phase full-bridge inverter used in accordance with the present invention.

The inverter 21 is shown in detail in FIG. 2. The inverter 21 in the exemplary embodiment is a full-bridge, three-phase inverter which includes three complementary pairs of inverter switches, namely A1 and A2, B1 and B2, and C1 and C2. The upper set of switches A1, B1, and C1 selectively connect the output lines A, B and C, respectively, to the +V line. The lower set of switches A2, B2 and C2 selectively connect the output lines A, B and C, respectively, to the −V line. The state of the individual switches, i.e., whether "on" or "off", is determined by the gating signal provided on the corresponding control lines 28. Thus, when the gating signal to switch A1 is a logic one, for example, the switch A1 will be in an "on" state and the A phase output line will be coupled directly to the +V line. When the gating signal to switch A1 is a logic zero, the switch A1 will be in an "off" state and the A phase output line will be electrically isolated from the +V line. Similarly, the states of the remaining inverter switches are selectively controlled by the gating signal provided on the respective control lines 28.

The PWM controller 22 supplies the appropriate sequence of gating signals (drivewords) on the control lines 28 to the inverter switches in order to generate the desired three-phase AC inverter output. The output of the inverter 21 includes line inductors 29 and filter capacitors 30 for smoothing the inverter output signal as will be appreciated.

Figure 3:
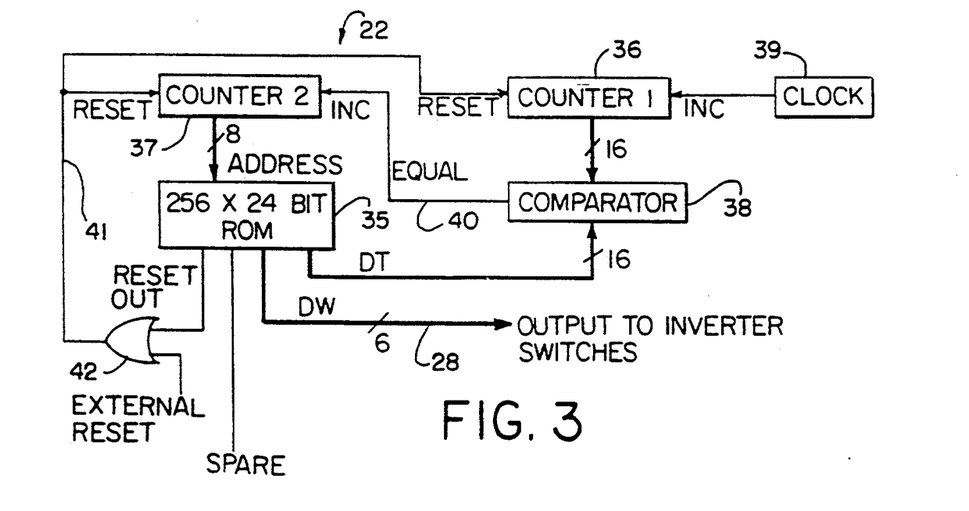
FIG. 3 is block diagram of a PWM controller having dual counters in accordance with one embodiment of the present invention.
Figure 4:
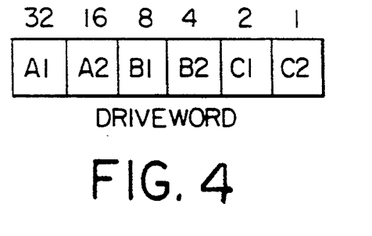
FIG. 4 is a bit map of a driveword for controlling the state of the inverter switches in accordance with the present invention.

Referring now to FIG. 3, a block diagram of a first embodiment of the PWM controller 22 in accordance with the present invention is shown. The PWM controller 22 includes a memory such as a read only memory (ROM) 35, a cycle counter 36, an address counter 37, a digital comparator 38, and a system clock 39. The ROM 35 has stored therein a series of drive data words making up a PWM sequence as will be explained further below. Each drive data word includes a driveword for controlling the inverter switch states and a drivetime word for providing relative timing information within the PWM sequence. The drivewords are accessed from the ROM 35 according to the order of the PWM sequence and are output onto a driveword (DW) data bus which serves as the control lines 28. As is better illustrated in FIG. 4, each driveword stored in the ROM 35 consists of a six-bit data word, in which each bit corresponds to a respective inverter switch control line 28. In the exemplary embodiment, each driveword is viewed as a six-bit word having conventional binary positions represented by binary 1, 2, 4, 8, 16 and 32 positions as is shown. The binary 32 position is used to control the state of switch A1. If the bit in the binary 32 position is a "1", for example, the signal on the control line 28 to the switch A1 is a logic "high" and the switch A1 will be in the on state. Similarly, the binary 16, 8, 4, 2 and 1 positions are used to control the respective states of the switches A2, B1, B2, C1 and C2 as is shown. Therefore, a driveword of "100101", as an example, would cause the inverter switches A1, B2, and C2 to be "on" and the inverter switches A2, B1, and C1 to be "off."

The drivetime word included in each drive data word stored in the ROM 35 is output from the ROM 35 onto a drivetime (DT) data bus. In the exemplary embodiment, each drivetime word is a 16-bit word that represents the time and/or position in the gating signal cycle that one or more of the inverter switches must change state from a previous state according to the PWM sequence. More particularly, the drivetime word is the switching time, also referred to herein as the cut or position, in the gating signal cycle of the PWM controller 22 in terms of beats or pulses of the system clock 39. For example, if the gating signal cycle (360°) is defined as being 10,000 beats of the system clock 39, the position of 180° in the gating signal cycle would be equivalent to a drivetime word of 5000. Similarly, 90° can be represented by a drivetime word of 2500, and so on. Thus, the drivetime word provides a way of translating a place in the gating signal cycle in terms of pulses received from the system clock 39. The cycle counter 36 counts the system clock pulses from zero to the end of the defined cycle count (i.e., 10,000) in order to provide a cycle reference time at the output of the cycle counter which is coupled to the ROM 35. The cycle counter 36 is then reset at the end of each cycle as explained further below.

The DT data bus on which the drivetime word retrieved from the ROM 35 is placed is connected to one input of the digital comparator 38. The other input of the digital comparator 38 is connected to the output of the cycle counter 36. The cycle counter 36 provides a cycle reference time, as is described above, which is used to determine when the next change in state of one or more of the inverter switches is to occur. More particularly, the digital comparator 38 compares the drivetime word on the DT data bus to the cycle reference time provided from the cycle counter 36. When both inputs to the digital comparator 38 are equal, the digital comparator 38 generates an output signal on line 40 which increments the address counter 37.

The output of the address counter 37 is connected to the address terminals of the ROM 35 and, as a result, the output of the address counter 37 determines which drive data word in the PWM sequence is accessed. As will be appreciated based on the description provided below in reference to FIG. 5, when the address counter 37 is incremented, the next drive data word in the PWM sequence, including the next driveword and drivetime word, is accessed from the ROM 35 and is delivered to the corresponding DW and DT data buses. Accordingly, the state of the inverter switches is changed with each new driveword which is placed on the DW data bus. The above procedure is repeated for each drive data word in the PWM sequence. A reset flag is encountered when the particular drive data word accessed from the ROM 35 corresponds to the gating signal at 360°, as is also described below with respect to FIG. 5. As a result, a reset signal is provided from the ROM 35 on line 41 via an OR gate 42 to reset the cycle counter 36 and the address counter 37. The address counter 37 will again cause the first drive data word in the PWM sequence to be accessed from the ROM 35, and the cycle counter 36 again begins counting from zero (representing zero degrees) and the cycle is repeated.

Figure 5:
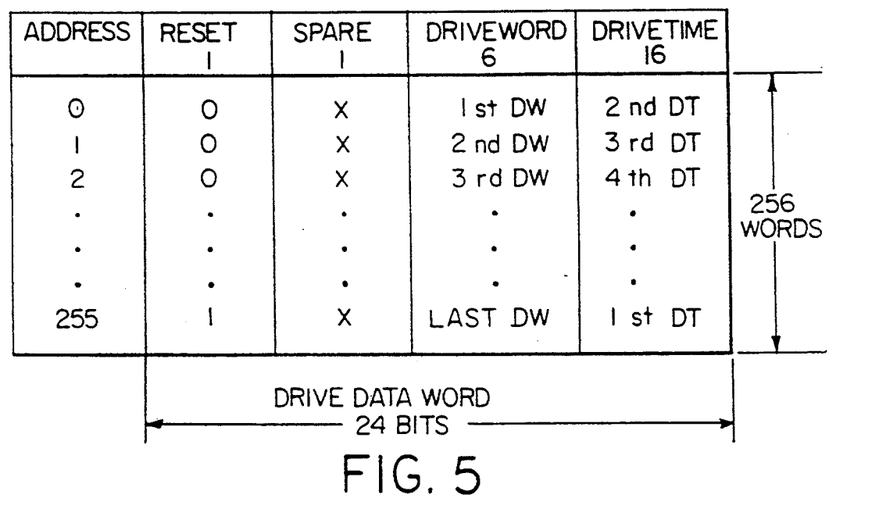
FIG. 5 is a ROM organization map of a PWM sequence stored in memory in accordance with one embodiment of the present invention.

Referring now to FIG. 5, the organization of the drive data words stored in the ROM 35 will be described in detail. The ROM 35 in the exemplary embodiment includes 256 precalculated drive data words forming a programmed PWM sequence stored at memory locations 0 through 255. Each drive data word is 24 bits long and includes a six-bit driveword and a sixteen-bit drivetime word as is mentioned above. In addition, each drive data word includes a reset bit and a spare bit. The drive data word stored at the address location 0 includes the first driveword in the PWM sequence representing the appropriate state of the inverter switches at 0°. The drive data word stored at the address location 255 includes the last driveword in the PWM sequence (i.e., .representing the state of the inverter switches at 360°). The remaining drivewords stored at memory locations 1–254 represent the state of the inverter switches in the PWM sequence between 0° and 360°, as will be appreciated.

It is noted that the drivetime included in the first drive data word at address location 0 is what is referred to herein as the "2nd drivetime" word. The 2nd drivetime word represents the time relative to the cycle reference time provided by the cycle counter 36 when the driveword provided to the inverter switches on the DW data bus is to change from the first driveword to the second driveword. Similarly, the drivetime included in the second drive data word at address location 1 is referred to as the 3rd drivetime word as it represents the time relative to the cycle reference time that the driveword provided to the inverter switches is to change from the second driveword to the third driveword in the PWM sequence. Thus, it can be seen that the drivewords and drivetimes are stored in an offset manner wherein a drive data word containing an "n" numbered driveword includes the drivetime for changing the output of the controller to the "n+1" numbered driveword. The above format is repeated in the ROM 35 such that the ROM 35 stores the programmed PWM sequence of drivewords for controlling the inverter switches along with the corresponding drivetimes which provide a reference relative to the cycle reference time indicating when in the cycle the next driveword in the PWM sequence is to be delivered to the inverter switches. When the last drive data word at address location 255 is encountered in the sequence, a "1" in the reset bit is found and the address counter 37 and cycle counter 36 are reset as is described in more detail below.

Figure 6:
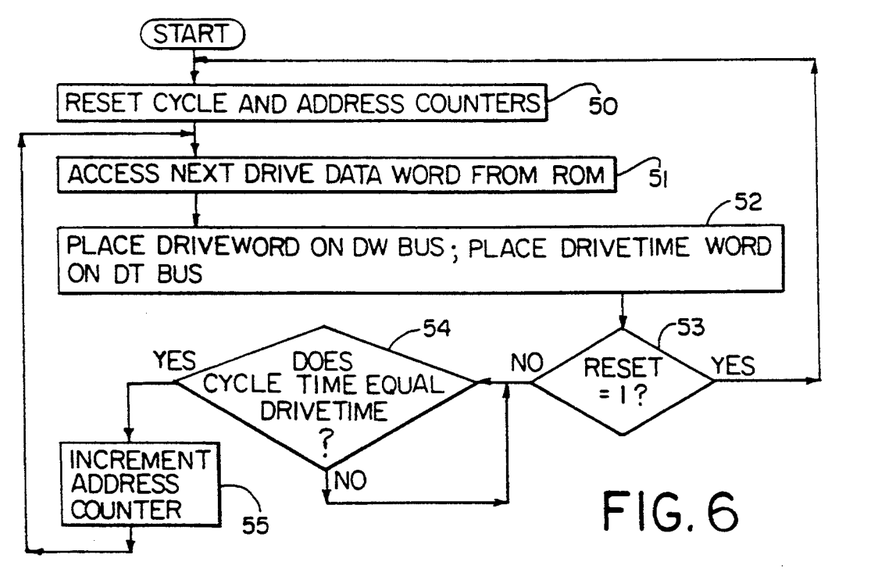
FIG. 6 is a system flow chart representing the operation of the PWM controller shown in FIG. 3 in accordance with the present invention.

The systematic operation of the PWM controller 22 will now be described with reference to FIGS. 3 and 6. Initially, the PWM controller 22 is reset as is represented in step 50 in FIG. 6. More particularly, the address counter 37 is reset to zero as is the cycle counter 36. Such reset may occur during power up of the PWM controller 22 as a result of a reset pulse delivered via the OR gate 42 from an external reset line, for example. In step 51, the first drive data word at the address location 0 is accessed from the ROM 35. In step 52, the driveword is placed on the DW data bus, and the drivetime word is placed on the DT data bus. As a result, the driveword establishes the state of the inverter switches. In step 53, the PWM controller 22 checks whether the reset bit in the accessed drive data word is present, i.e., a logic "1".

In step 54, the digital comparator 38 determines whether the cycle reference time provided by the cycle counter 36 is equal to the 2nd drivetime word, thus indicating that it is time to change the driveword provided to the inverter switches from the first driveword to the second driveword in the PWM sequence. If the cycle reference time is not equal to the 2nd drivetime word, the PWM controller 22 continues to loop through step 54 until the cycle time reference eventually equals the 2nd drivetime word, indicating that it is time to change the driveword applied to the inverter switches to the next driveword in the PWM sequence. When this occurs, the digital comparator 38 in step 55 produces a next drive data word request signal which increments the address counter 37, thus producing an address counter output of 1 delivered to the address terminals of the ROM 35. The PWM controller 22 returns to step 51, and the next drive data word (i.e., the drive data word at address location 1 and including the 2nd driveword) is accessed from the ROM 35. The above steps 51-55 are repeated such that the entire PWM sequence of drivewords is delivered as gating signals to the inverter switches in order to generate an inverter output cycle. When, in step 51, the last drive data word in the sequence is accessed from the ROM 35 (i.e., from address location 255), the PWM controller 22 detects that the reset bit is active (step 52). The reset bit from the ROM 35 output in the preferred embodiment is simply hardwired to the reset terminals of the cycle and address counters 36 and 37, respectively. As a result, the PWM controller 22 resets the cycle and address counters 36 and 37 and the above cycle procedure is repeated as the system returns to step 50. Thus, the PWM controller 22 provides a PWM sequence of drivewords (or gating signals) to the inverter switches on a continuing basis, and a continuous three-phase AC output signal is provided by the inverter 21.

An important feature of the PWM controller 22 is that it is not necessary to store in the ROM 35 the gating signals for the inverter switches for each time interval identified by the system clock 39. In existing PWM controllers such as those described above, a gating signal for the inverter switches is stored for each time interval as determined by the resolution of the PWM controller. As a result, the PWM sequence stored in memory would typically include identical gating signals over several time intervals which represent the situation where the state of the switches are to remain the same during such time intervals. This results in a large amount of memory being required as is noted above. The present invention, on the other hand, avoids storing identical gating signals or drivewords which necessitate a larger amount of memory. Rather than store redundant drivewords which do not change over two or more time intervals, the PWM controller 22 stores the corresponding drivetime word information indicating when changes in the driveword are to take place in the PWM sequence. Thus, for example, in the ROM 35 of FIG. 5, only 6.144 Kbits of memory are required to store the entire PWM sequence. This example is based on a resolution of 0.0069° and an inverter output frequency of 60 Hz.

The precalculated or programmed drive data words that are stored in the ROM 35 can be arrived at in a variety of ways as will be appreciated. The references referred to above describe the underlying theory of calculating PWM sequences. As one example, developed for the present invention, reference is made to Table 1 which represents a two-state harmonic elimination PWM sequence for eliminating nine harmonics in a single-phase waveform; namely the third, fifth, seventh, eleventh, thirteenth, seventeenth, nineteenth, twenty-third, and twenty-fifth harmonics. Using known harmonic elimination algorithms, the calculated value in degrees (or the "cut" in the cycle) at which a change in the inverter switches is to occur in order to eliminate the desired harmonics can be calculated. For a 60 Hz inverter output cycle, the respective time intervals between cuts is as shown in the third column. Table 1 represents the PWM values for the first quarter-cycle only, noting that from 54.05° to 90° there is no change in the state of the switches.

TABLE 1

| 2 STATE H E PROGRAM | | |
|---|---|---|
| 9 Harmonics Elim | Calculated Values in Degrees | Interval in usecs |
| 3 | 6.28 | 290.9 |
| 5 | 13.24 | 317.5 |
| 7 | 17.57 | 205.1 |

TABLE 1-continued

2 STATE H E PROGRAM

| 9 Harmonics Elim | Calculated Values in Degrees | Interval in usecs |
|---|---|---|
| 11 | 26.08 | 393.8 |
| 13 | 29.13 | 141.4 |
| 17 | 39.14 | 463.4 |
| 19 | 41.21 | 95.9 |
| 23 | 52.51 | 522.9 |
| 25 | 54.05 | 71.3 |

From the data shown in Table 1, the same information can be determined for the remainder of the cycle. Furthermore, by shifting the information by 120° and 240°, the information from Table 1 also can be used to generate the values in degrees and the respective time intervals for the other two phases in a three-phase system. The data for the three-phases can then be combined and arranged in chronological order so as to include a data entry for each degree value and the corresponding time interval after which the next change occurs in one or more phases. Table 2 shows a Fourier analysis of the harmonic elimination pattern of Table 1. As can be seen, such a programmed PWM sequence results in the elimination of the selected harmonics.

TABLE 2

FOURIER ANALYSIS

| Harmonic | Coefficient | % of Fundamental |
|---|---|---|
| −1 | −1.0287 | 100.00 |
| 3 | 0.0000 | −0.00 |
| 5 | −0.0000 | 0.00 |
| 7 | −0.0000 | 0.00 |
| 9 | 0.0510 | −1.96 |
| 11 | 0.0000 | −0.00 |
| 13 | 0.0000 | −0.00 |
| 15 | 0.0473 | −4.60 |
| 17 | −0.0000 | 0.00 |
| 19 | −0.0000 | 0.00 |
| 21 | 0.0693 | −6.74 |
| 23 | 0.0000 | −0.00 |
| 25 | −0.0000 | 0.00 |
| 27 | 0.3317 | −32.25 |
| 29 | 0.5623 | −54.66 |
| 31 | 0.3293 | −32.01 |
| 33 | 0.0421 | −4.09 |
| 35 | 0.0032 | −0.32 |
| 37 | −0.0141 | 1.37 |
| 39 | −0.0552 | 5.36 |
| 41 | −0.0047 | 0.46 |

Using the principles described above with respect to Table 1, an exemplary PWM sequence for the PWM controller 22 can be formulated. Table 3 represents such a PWM sequence. In Table 3 (see Appendix), the first column represents the above-described drivetime words in terms of beats of the system clock 39. In this particular example, 52,083 beats is selected to equal 360°. At 60 Hz, this results in a resolution of 320 nanoseconds or 0.00691° (i.e., thus requiring a system clock 39 frequency of 3.125 MHz). The sixth column in Table 3 represents the actual driveword (in decimal form) which is to be applied to the inverter switches at the respective drivetime listed in the same row.

Thus, at a drivetime of 2769 for example, the driveword is to be changed to a "41" represented by the six-bit binary driveword of 101001. At a drivetime of 3018, the driveword is to be changed from a "41" to a "9" represented by a binary 001001. According to FIG. 4, such change represents the inverter switch A1 turning off. Using the data tabulated in Table 3 and providing for the above-mentioned "offset", the respective entries of the drivewords and drivetime words can be stored in the ROM 35 according to the organization set forth in FIG. 5.

The second column in Table 3 indicates the number of pulses or beats from the system clock 39 since a previous change in the driveword. The values shown in the second column are useful to ensure that the changes in the driveword provided by the PWM controller 22 to the inverter switches do not occur too soon so as to exceed the switching capabilities of the inverter 21. More particularly, if the PWM sequence ordinarily requires two or more changes in the driveword a very short time apart, the inverter 21 switches, for example, may not be able to respond quickly enough to implement such programmed changes in the states of the inverter switches. As part of the present invention, changes in the driveword delivered to the inverter switches which theoretically are programmed to occur too rapidly based on the limitations of the system 20 can be compensated as follows. If, for example, one change theoretically is programmed to occur at a drivetime of 4908, and a following change theoretically occurs at a drivetime of 4909, the drivetime word and driveword data are adjusted according to the present invention so that both changes occur at a common time, i.e., at a drivetime of 4909.

The fifth column in Table 3 represents the actual change (in decimal form) in the driveword applied to the inverter switches. As an example, the change in the driveword between the drivetimes designated 2769 and 3018 is a −32, thereby representing the turning off of the switch A1 as is mentioned above. It will be further appreciated that a +32 in the fifth column would represent the turning on of the switch A1. Similarly, the information in the fifth column in Table 3 can be used to identify the turning on and off of the other inverter switches based on the corresponding binary positions.

Another important aspect of the present invention pertains to the use of built-in delays in the PWM sequence stored in the ROM 35. More particularly, Table 3 illustrates the use of built-in delays so that there will be during a change in the state of one of the switches in a phase that both switches in that particular phase are off so as to provide "soft switching", also referred to herein as zero voltage switching. As will be appreciated by those familiar in the art, it is desirable to keep the voltage across an inverter switch which is about to be turned on to zero volts. In the present invention, suppose, for example, that the inverter switch B1 is presently turned on and switch B2 is turned off so that the B phase output line is pulled up to the +V line. When the calculated PWM sequence requires that the inverter switch B1 be turned off and the inverter switch B2 turned on, steps can be taken to ensure that zero voltage switching will occur. The present invention provides zero voltage switching as follows.

Suppose switch B1 is turned off and switch B2 remains off (i.e., at a drivetime of 11399). The current that is flowing in the inductance of the output filter and/or load 27 will cause the voltage at the point of connection of B1 and B2 to swing negatively until it is clamped to the −V line by the antiparallel diode across B2. This results in a condition of virtually zero voltage across the switch. The time for the voltage to swing to −V is a function of the speed of the switch turnoff, the line current, and the size of the filter/load inductance. The dwell time during which it will remain clamped to −V is determined by the amount of line current and the size of the output filter/load inductance. A delay can be inserted in the time between the turn-off of B1 and the turn-on of B2. This delay should be longer than the maximum voltage swing time and shorter than the minimum dwell time for the circuit. In the exemplary embodiment, these criteria are satisfied by a delay of fifty (50) beats (i.e., B1 is not turned on until a drivetime of 11449).

As a result, zero voltage switching is ensured. It will be noted, therefore, that there are several 50 beat delays (shown in the second column) in Table 3 which represent the,inclusion of an extra driveword in the PWM sequence for the turning off of one inverter switch in a phase pair and turning on of the complimentary inverter switch in that pair so that zero voltage switching is accomplished. Even though this results in extra drive data words being stored in the ROM 35, the present invention still requires far less memory space than the known PWM controllers. Moreover, if zero-voltage switching is not desired, than the number of drive data words in the PWM sequence will be even further reduced. For example, the fourth column in Table 3 represents the actual driveword DW value in the case where there are no delays for zero voltage switching. So at any given switch change, the DW value with no delay represents one switch coming; on and the opposite switch going off simultaneously. The redundant values of the driveword in the fourth column illustrate how even fewer drivewords can be utilized in the PWM sequence if the extra drivewords included for zero-voltage switching are omitted.

It will be readily apparent to those having ordinary skill in the art that any given PWM sequence for an inverter can be utilized in accordance with the present invention. The actual PWM sequence can be derived using any of a variety of known algorithms. The above description pertaining to Tables 1-3 is provided solely as an example of how the specific drivewords and the corresponding drivetime words for each drive data word can be obtained. Other techniques for determining appropriate gating signals in a PWM sequence and the corresponding drivetimes are known. A primary feature of the PWM controller 22, however, is that the PWM controller 22 obviates the need to store the value of the gating signal for each and every discrete time interval as determined by the desired resolution notwithstanding whether the gating signal changes. Moreover, although the exemplary PWM sequence in Table 3 includes revisions and/or additional entries for compensating for rapid driveword changes and for providing zero-voltage switching, it will be appreciated that such techniques are not necessary to the present invention but are provided herein merely to emphasize some of the inventions many features.

Figure 7:
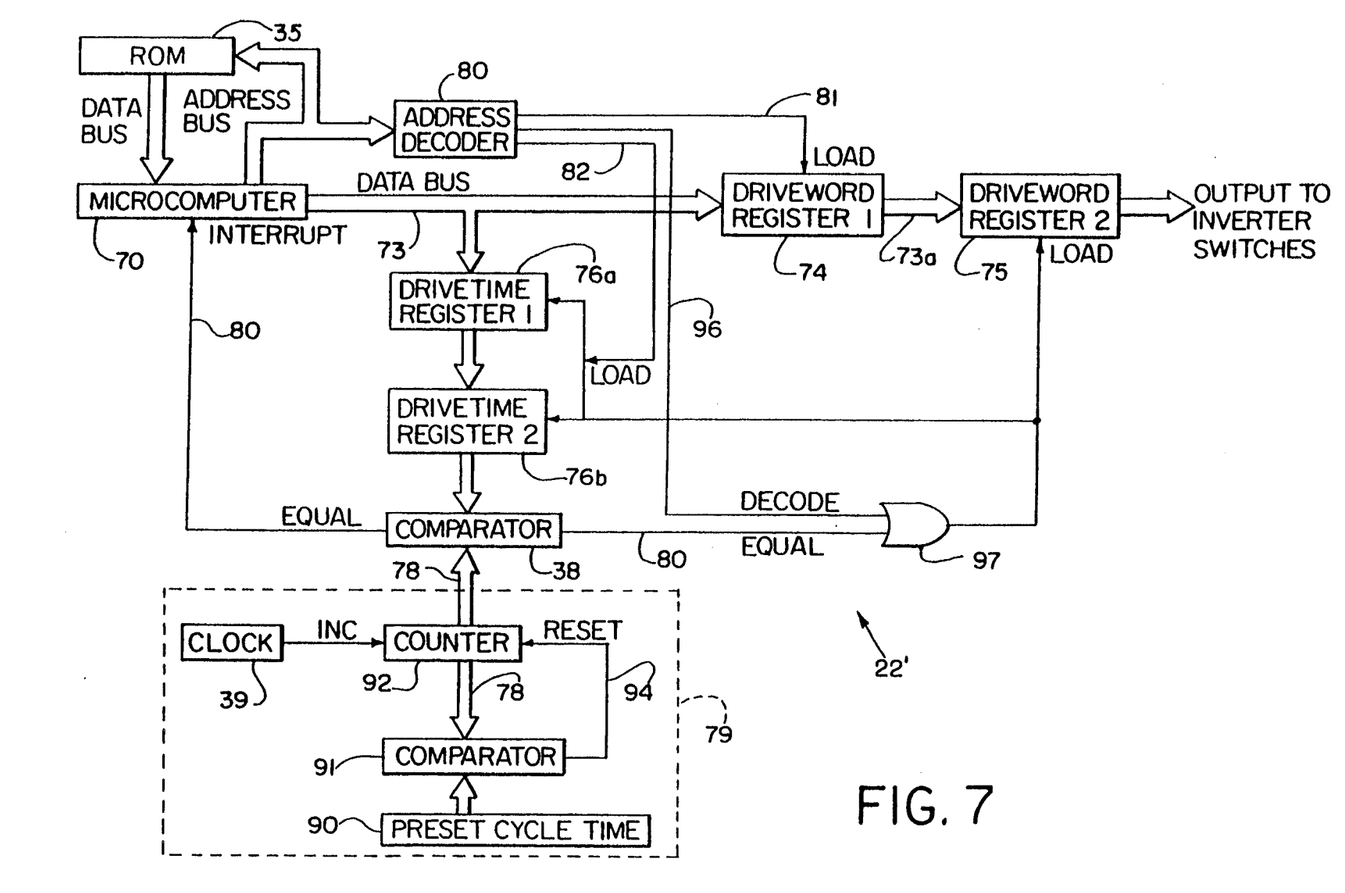
FIG. 7 is a block diagram of a PWM controller having a microcomputer and a dedicated counter in accordance with another embodiment of the present invention.

Another embodiment of the PWM controller 22 in accordance with the present invention is shown in FIG. 7 and is designated 22'. Although the PWM controller 22' includes a general purpose microprocessor 70, the PWM controller 22' does not suffer from the above-mentioned drawbacks associated with previous PWM controllers including a microprocessor, as will be apparent based on the following description. The PWM controller 22' includes a ROM 35, a system clock 39 and a comparator 38 as in the embodiment shown in FIG. 3. The microprocessor 70 is used to access the drive data words stored in the ROM 35 by way of an address bus 71 and a data bus 72. A data bus 73 is used by the microprocessor 70 to transfer the drivewords retrieved from the ROM 35 to a first driveword register 74. This operation includes the microprocessor 70 outputting a first address momentarily over the address lines 71 which address is decoded by an address decoder 80 to generate a load signal pulse over line 81 directing register 74 to load the data over lines 73. In addition, the microprocessor 70 uses the data bus 73 to transfer the drivetimes retrieved from the ROM 35 to a first drivetime register 76a in a similar manner as that described for the drivewords except a second address is output and decoded to generate a load signal over line 82.

As is previously described with respect to FIG. 5, each drive data word stored in the ROM 35 includes a driveword and drivetime word which corresponds to the time when the next driveword is to be delivered to the inverter switches. Each driveword retrieved from the ROM 35 is initially stored by the microprocessor 70 in the first driveword register 74, and is subsequently shifted therefrom to a second driveword register 75 via bus 73a. This operation includes the microcomputer 70 outputting a third address over the address lines 71 which address is decoded by the address decoder 80 to generate a decode signal over lines 96 to an input of an OR gate 97 to generate a load signal to the register 75 directing it to store the data over data bus 73a. Thereafter, the next drive data word in the PWM sequence is retrieved from the ROM 35 and is stored in the first driveword register 74. The driveword which is stored in the second driveword register 75 is used to drive the inverter switches in order to control the state of the inverter switches in the same manner described above. Similarly, each drivetime word of register 76a is shifted to a second register 76b by the load signal of gate 97.

A cycle reference time on a data bus 78 is provided from a cycle timing circuit 79 and is input to the digital comparator 38. When the cycle reference time is equal to the drivetime stored in the second drivetime register 76b, the digital comparator outputs an interrupt signal on line 80 to the microprocessor 70 representing a next data word request signal. An interrupt service routine in the microprocessor 70 prompts the microprocessor 70 upon receipt of the interrupt to generate the address of the next drive data word in the PWM sequence to be retrieved from the ROM 35, and to retrieve such drive data word and load the corresponding driveword and drivetime word, respectively into the first driveword register 74 and the first drivetime register 76a. Based on the disclosure provided herein, the microprocessor 70 can be programmed to perform these functions as well as all other functions described herein using conventional programming techniques; therefore, detail in this regard is omitted.

The cycle timing circuit 79 includes the system clock 39, a preset cycle time register 90, a digital comparator 91, and a dedicated counter 92 having a dual output coupled to the input of the comparator 38 and the comparator 91, respectively, for providing the cycle reference time. The preset cycle time register 90 has stored therein a preselected cycle time duration defined in terms of the number of beats of the system clock 39. Such cycle time may be, for example, 52083 system clock pulses representing a complete cycle of discrete time intervals as is described above with respect to the previous embodiment. The counter 92 counts the system clock 39 pulses from zero up to the value stored in the preset cycle time register 90. When the output of the counter 92 is equal to the preset cycle time duration, the comparator 91 generates a reset signal on line 94 which serves to reset the counter 92. As a result, the cycle timing circuit 79 continuously provides to the comparator 78 an incrementing count representing discrete time intervals within each cycle. It will be appreciated that the output frequency of the inverter 21 can be altered simply by changing the cycle time duration stored in the preset cycle time register 90.

Figure 8:
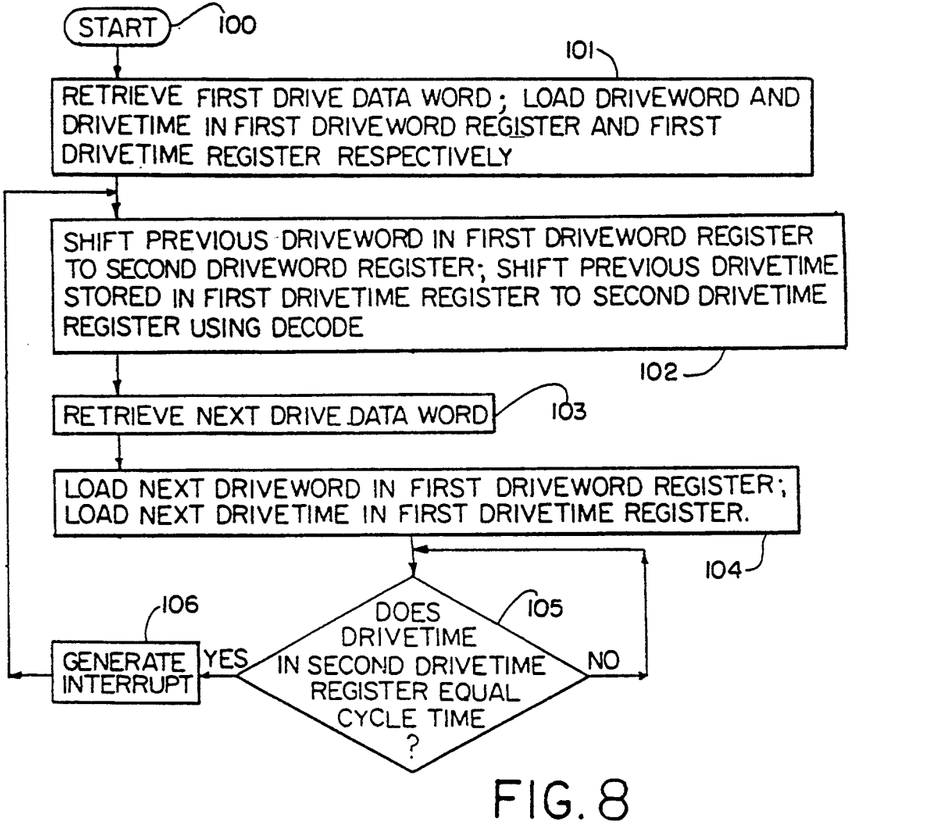
FIG. 8 is a system flow chart describing the operation of the PWM controller shown in FIG. 7.

Referring then to FIG. 8, the operation of the PWM controller 22' will be described with reference to a system flowchart. In step 100, the PWM controller 22' is initialized whereby the counter 92 is reset via a system reset (not shown). In step 101, the microprocessor 70 retrieves the first drive data word in the PWM sequence from the ROM 35 (FIG. 5). The microprocessor 70 loads the first driveword included therein into the first driveword register 74, and also loads the corresponding 2nd drivetime word into the first drivetime register 76a. In step 102, the microcontroller 70 moves, i.e. shifts, the first driveword, which was previously stored in the first driveword register 74, to the second driveword register 75 which directly controls the inverter switches as described above using the DECODE signal and OR gate 97 having an output connected to the load request input of the second driveword register 75. Also in step 104, the microprocessor 70 moves or shifts the first drivetime word from the first to the second drivetime register 76b via the same load request signal.

In step 103, the microprocessor 70 retrieves the next drive data word in the PWM sequence from the ROM 35. In step 104, the second driveword (included in the next drive data word) is loaded into the first driveword register 74 and the third drivetime word associated therewith is loaded into the first drivetime register 76a. As a result, after step 104 the first driveword which is stored in the second driveword register 75 is coupled to the inverter switches, and the 2nd drivetime word stored in the second drivetime register 76b is input to the comparator 38. In step 105, the comparator 38 checks whether the cycle time provided by the cycle timing circuit 79 equals the drivetime word stored in the second drivetime register 76b. If not, the PWM controller 22' continues in a loop around step 105 until the cycle time equals the drivetime indicating that it is time to change the driveword provided to the inverter switches and drivetime word of register 76b.

When the cycle time does equal the drivetime word stored in the second drivetime register 76b, the comparator 38 generates an equal signal over line 80 to cause the loading of the driveword and drivetime word of registers 74 and 76a into the registers 75 and 76b, respectively, via gate 97. The comparator 38 also generates an interrupt signal (step 106) to the microprocessor 70 causing it to return to step 102 wherein the next drive data word is retrieved from the ROM 35 and the associated drive word and drivetime word thereof are loaded into the registers 74 and 76a, respectively. As a result, the third, fourth, etc., drive data words in the PWM sequence will be retrieved by the microprocessor 70 from the ROM 35. The PWM controller 22' will accordingly retrieve all of the drive data words in the PWM sequence by systematically shifting the respective drivewords and drivetime words through the respective registers.

After the PWM controller 22' is initialized in step 100 and the first two drive data words in the PWM sequence are loaded into the first and second driveword and drivetime registers as described above, the PWM controller 22' remains in the loop around step 105 until a change in the driveword is required. Most importantly, during such time that the PWM controller 22' is in the loop about step 105, the microprocessor 70 is not required to perform any computational and/or control functions relating to the PWM controller 22'. Rather, the microprocessor 70 is used merely as a means for transferring data from the ROM 35 to the driveword and drivetime registers when a change in the driveword is required. As a result, the microprocessor 70 is free to handle other computing burdens in between the interrupts generated in step 106. Alternatively, the same microprocessor 70 used in a previous PWM controller which limited the available resolution can be used in the PWM controller 22' and achieve higher inverter output frequencies. Still another advantage is that a slower, less expensive microprocessor 70 can be used in the PWM controller 22' as compared to known PWM controllers and still achieve the same output frequencies.

It will be appreciated from the above description that the PWM controller of the present invention can store in the ROM 35 any precalculated PWM sequence of drive data words having particular output characteristics desired for operating the inverter. For example, the PWM sequence stored in the ROM 35 can be selected to provide an inverter output waveform having a particular harmonic content, modulation index, magnitude, frequency, etc. Because the present invention requires only a small amount of memory to store any given PWM sequence, it is possible to store multiple PWM sequences in the ROM 35, each having a different output characteristic.

Thus, in another embodiment of the present invention, multiple PWM sequences are stored in the ROM 35 on what are referred to herein as "separate pages". Each page represents a block of memory in the ROM 35 which is used to store a particular PWM sequence. By selectively accessing a page from the ROM 35 and driving the inverter 21 using the PWM sequence stored therein, different output waveforms from the inverter 21 can be obtained. A variety of addressing methods can be employed for selectively accessing the different pages of PWM sequences stored in the ROM 35 so that the PWM controller 22 can implement the PWM sequence as described above. One method using a memory offset will be described with respect to FIG. 9.

Figure 9:
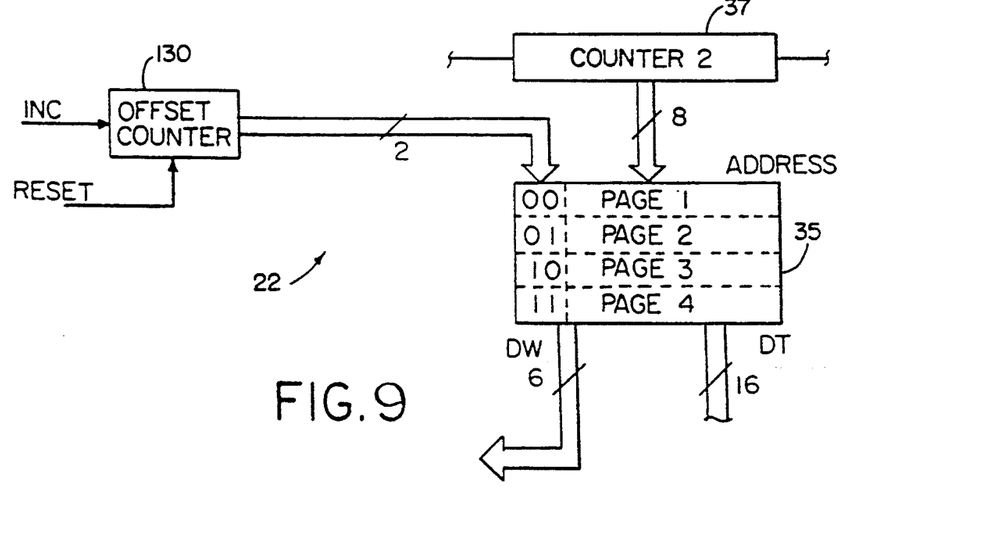
FIG. 9 is a partial block diagram of another embodiment of the PWM controller of the present invention.

FIG. 9 illustrates in relevant part a modified PWM controller 22 which can access PWM sequences stored on different pages in the ROM 35. In the embodiment shown in FIG. 9, the ROM 35 is a 1K×24 bit ROM which is capable of storing, for example, four different PWM sequences of approximately the same size as that described with respect to FIG. 5. In this particular embodiment, the ROM 35 has a 10-bit address input and contains four pages identified by the two most significant bits of the memory address. The four pages contain the respective PWM sequences, and in order to access the PWM sequences, the two most significant address bits of the ROM 35 are connected to the output of a two-bit offset counter 130 which can be separate or part of the PWM controller 22. After the desired page is selected using an increment input to the counter 130, the PWM controller proceeds to implement the selected PWM sequence via the eight least-significant bits in the same manner as is described above.

Figure 10:
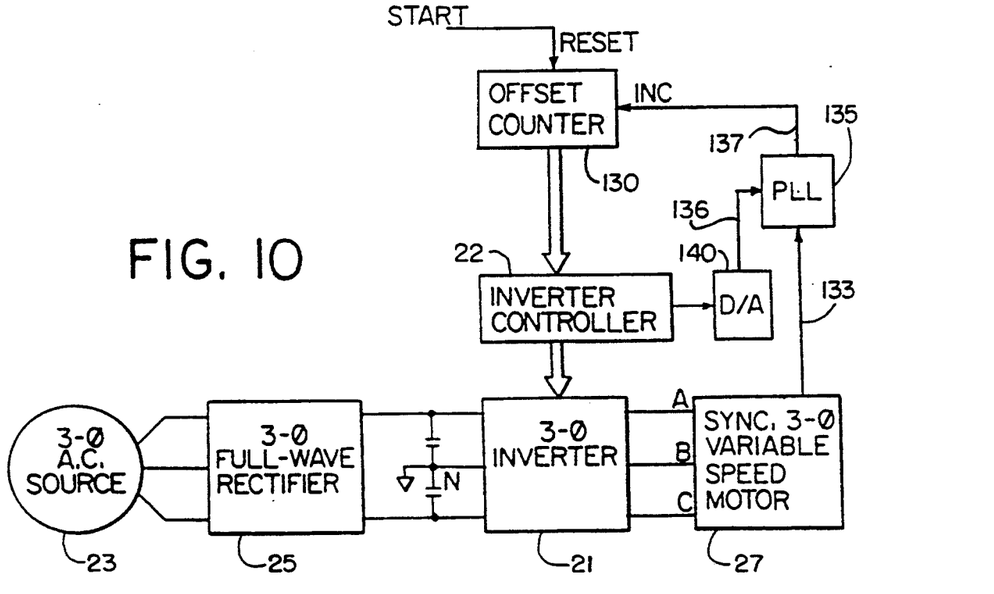
FIG. 10 is a block diagram of a variable speed synchronous motor drive system including a PWM controller and an inverter in accordance with the present invention.

Referring now to FIG. 10, a particular application of the PWM controller 22 of the present invention will be described. In FIG. 10 a variable speed synchronous motor system 140 is shown. The system 140 is substantially identical to that shown in FIG. 1, so only the substantive differences will be described herein. In the system 140, the synchronous variable speed motor serves as the load 27. The PWM controller 22 has a ROM 35 which stores four different PWM sequences, each of which produce an inverter 21 three-phase output having a different frequency. An offset counter 130 is included in the system which permits the individual PWM sequences to be accessed selectively as described, for example, with respect to FIG. 9.

The motor 27 includes a sensor such as a winding (not shown) which produces an output frequency on line 133 which is related to the positional phase of the rotor. The phase information on line 133 is input into a phase lock loop (PLL) 135 which compares the phase position of the rotor to the phase of the inverter 21 output as represented by the signal on line 136. It is important when changing the frequency of the inverter 21 so as to change the speed of the motor 27 that the inverter 21 output be applied to the motor stator windings at the proper moment to maintain the output torque and the synchronous relation between the inverter 21 and the motor 27. The PLL 135 provides an output signal on line 137 based on the phase relationship between the inverter 21 and the motor 27. The output signal 137 increments the offset counter 130 to a different page to be accessed by the PWM controller 22. As a result, a different frequency inverter output signal is provided to the motor 27, thereby changing its speed.

The signal on line 136 is connected to the VCO input of the PLL 135 and is provided from the output of a digital to analog converter (D/A) 140. The input of the D/A 140 is connected to a control output of the PWM controller 22. Such control output can be provided, for example, by one of the control output lines 28. The gating signal delivered on each control line 28 will have a particular duty cycle depending on the phase of the inverter output as will be appreciated. The signal on the control line 28 is converted by the D/A 140, and can be used as a reference signal on line 136. Other conventional methods for providing the reference signal on line 136 can be used in the alternative. Furthermore, it will be appreciated that if the load 27 were an induction motor or the like where it is not as important when the frequency of the inverter is changed, it is possible to simply increment the offset counter 130 whenever desirable.

Figure 11:
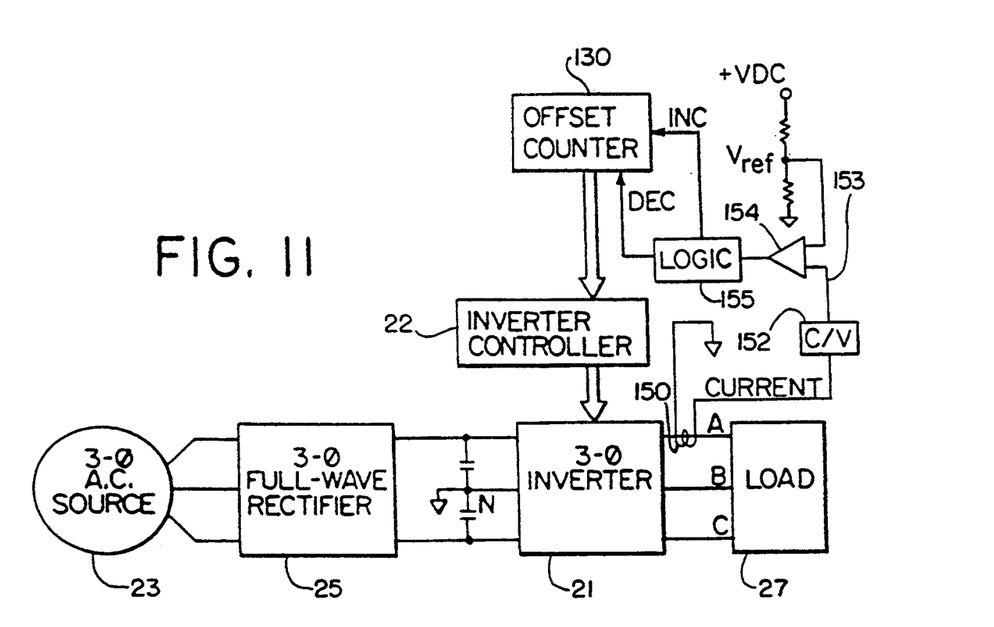
FIG. 11 is a block diagram of a current mode regulator including a PWM controller and an inverter in accordance with the present invention.

FIG. 11 illustrates yet another application for the PWM controller 22 having multiple PWM sequences stored therein. FIG. 11 shows a current regulation system in which the current delivered to the load 27 is controlled by way of switching between different PWM sequences in the ROM 35 (FIG. 9). A current sensor 150 such as an inductive coil is used to detect the current delivered to the load 27. A current-to-voltage (C/V) converter 152 converts the current signal from the sensor 150 into a voltage which is proportional to the amount of current delivered to the load 27 and which is output on line 153. The voltage on line 153 is compared using a comparator 154 to a reference voltage $V_{ref}$ to determine if the current delivered to the load is at a preselected level.

If the current delivered to the load 27 deviates from the preselected level represented by the reference voltage $V_{ref}$, the output of the comparator 154 will change state and the logic circuit 155 will either increment or decrement the offset counter 130 based on the known contents of the ROM 35. As a result, a different PWM sequence will be selected which is designed to alter the current delivered to the load, i.e., by changing the magnitude of the inverter 21 output to converge to that desired. Similarly, if the current delivered to the load 27 falls below the preselected level represented by the reference voltage $V_{ref}$, the logic circuit either increments or decrements the offset counter 130. Therefore, a different PWM sequence will be selected from the ROM 35 which is designed to alter the current to the load.

Moreover, by substituting a voltage sensor (not shown) in place of the current sensor 150 and C/V converter 152 in the system of FIG. 11, it will be appreciated that the present invention also has application as a voltage regulation system. The voltage sensor detects the voltage delivered to the load 27, and the comparator 154 compares the output from the voltage sensor to the reference voltage $V_{ref}$. As a result, a different PWM sequence can be selected automatically to alter the voltage delivered to the load 27 in the same manner described above with respect to current regulation.

In summary, the present invention overcomes the above-mentioned and other shortcomings of existing PWM controllers for controlling an inverter. The present invention relates to a PWM controller, and preferably a harmonic elimination type PWM controller, which does not require a large amount of memory storage and does not require a microprocessor. The PWM controller of the present invention can be used to control an inverter at higher output frequencies than previously achievable, i.e., with 7-11 harmonic elimination waveforms on an inverter output frequency up to 1000 Hz. Moreover, the PWM controller according to the present invention is simpler in design, less expensive to manufacture, and is smaller in size as compared to existing PWM controllers having a microprocessor.

According to another embodiment, the present invention relates to a PWM controller having a slower and less expensive microprocessor than required in known PWM controllers, without having to sacrifice the maximum output frequency of the inverter. The present invention relates to a PWM controller which can provide a higher inverter output frequency using the same type of microprocessor used in other known controllers. Moreover, the present invention substantially reduces the computational time required by the microprocessor, thus enabling the microprocessor to perform other tasks within the system.

Although the invention has been shown and described with respect to certain preferred embodiments, it is obvious that equivalents and modifications will occur to others skilled in the art upon the reading and understanding of the specification. For example, although the invention is described with respect to a full-bridge inverter, the invention can be used in connection virtually any type of inverter having switches requiring control. Furthermore, the ROM 35 is described above as having stored therein in an offset manner the various drivewords and drivetime words of the PWM sequence. It will be appreciated, however, that another embodiment can include a different storage structure in the ROM 35, for example having a different offset or no offset at all depending on the circuitry used to access and implement the PWM sequence. The present invention includes all such equivalents and modifications, and is limited only by the scope of the following claims.

TABLE 3

| DT | Change in DT | DW with no delay | Change in DW | DW |
|---|---|---|---|---|
| | | | 26 | 24 |
| 50 | 50 | | 2 | 26 |
| 861 | 811 | 16 | 42 | −16 | 10 |
| 909 | 48 | −1 | 41 | 30 | 40 |
| 959 | 50 | 0 | 41 | 1 | 41 |
| 1084 | 125 | −16 | 25 | −32 | 9 |
| 1134 | 50 | 0 | 25 | 16 | 25 |
| 1902 | 768 | 1 | 26 | −1 | 24 |
| 1952 | 50 | 0 | 26 | 2 | 26 |
| 2542 | 590 | −1 | 25 | −2 | 24 |
| 2592 | 50 | 0 | 25 | 1 | 25 |
| 2719 | 127 | 16 | 41 | −16 | 9 |
| 2769 | 50 | 0 | 41 | 32 | 41 |
| 3018 | 249 | −16 | 25 | −32 | 9 |
| 3068 | 50 | 0 | 25 | 16 | 25 |
| 3774 | 706 | 1 | 26 | −1 | 24 |
| 3824 | 50 | 0 | 26 | 2 | 26 |
| 4215 | 391 | −1 | 25 | −2 | 24 |
| 4265 | 50 | 0 | 25 | 1 | 25 |
| 4467 | 202 | 16 | 41 | −16 | 9 |
| 4517 | 50 | 0 | 41 | 32 | 41 |
| 4908 | 391 | −16 | 25 | −32 | 9 |
| 4958 | 50 | 0 | 25 | 16 | 25 |
| 5663 | 705 | 1 | 26 | −1 | 24 |
| 5713 | 50 | 0 | 26 | 2 | 26 |
| 5963 | 250 | −1 | 25 | −2 | 24 |
| 6013 | 50 | 0 | 25 | 1 | 25 |
| 6139 | 126 | 16 | 41 | −16 | 9 |
| 6189 | 50 | 0 | 41 | 32 | 41 |
| 6780 | 591 | −16 | 25 | −32 | 9 |
| 6830 | 50 | 0 | 25 | 16 | 25 |
| 7597 | 767 | 1 | 26 | −1 | 24 |
| 7647 | 50 | 0 | 26 | 2 | 26 |
| 7772 | 125 | 16 | 42 | −16 | 10 |
| 7820 | 48 | −1 | 41 | 30 | 40 |
| 7870 | 50 | 0 | 41 | 1 | 41 |
| 8681 | 811 | −16 | 25 | −32 | 9 |
| 8731 | 50 | 0 | 25 | 16 | 25 |
| 9542 | 811 | −4 | 21 | −8 | 17 |
| 9590 | 48 | 16 | 37 | −12 | 5 |
| 9640 | 50 | 0 | 37 | 32 | 37 |
| 9765 | 125 | 4 | 41 | −4 | 33 |
| 9815 | 50 | 0 | 41 | 8 | 41 |
| 10582 | 767 | −16 | 25 | −32 | 9 |
| 10632 | 50 | 0 | 25 | 16 | 25 |
| 11223 | 591 | 16 | 41 | −16 | 9 |
| 11273 | 50 | 0 | 41 | 32 | 41 |
| 11399 | 126 | −4 | 37 | −8 | 33 |
| 11449 | 50 | 0 | 37 | 4 | 37 |
| 11699 | 250 | 4 | 41 | −4 | 33 |
| 11749 | 50 | 0 | 41 | 8 | 41 |
| 12454 | 705 | −16 | 25 | −32 | 9 |
| 12504 | 50 | 0 | 25 | 16 | 25 |
| 12895 | 391 | 16 | 41 | −16 | 9 |
| 12945 | 50 | 0 | 41 | 32 | 41 |
| 13147 | 202 | −4 | 37 | −8 | 33 |
| 13197 | 50 | 0 | 37 | 4 | 37 |
| 13588 | 391 | 4 | 41 | −4 | 33 |
| 13638 | 50 | 0 | 41 | 8 | 41 |
| 14344 | 706 | −16 | 25 | −32 | 9 |
| 14394 | 50 | 0 | 25 | 16 | 25 |
| 14643 | 249 | 16 | 41 | −16 | 9 |
| 14693 | 50 | 0 | 41 | 32 | 41 |
| 14820 | 127 | −4 | 37 | −8 | 33 |
| 14870 | 50 | 0 | 37 | 4 | 37 |
| 15460 | 590 | 4 | 41 | −4 | 33 |
| 15510 | 50 | 0 | 41 | 8 | 41 |
| 16278 | 768 | −16 | 25 | −32 | 9 |
| 16328 | 50 | 0 | 25 | 16 | 25 |
| 16453 | 125 | −4 | 21 | −8 | 17 |
| 16501 | 48 | 16 | 37 | −12 | 5 |
| 16551 | 50 | 0 | 37 | 32 | 37 |
| 17361 | 810 | 4 | 41 | −4 | 33 |
| 17411 | 50 | 0 | 41 | 8 | 41 |
| 18222 | 811 | 1 | 42 | −1 | 40 |
| 18270 | 48 | −4 | 38 | −6 | 34 |
| 18320 | 50 | 0 | 38 | 4 | 38 |
| 18445 | 125 | −1 | 37 | −2 | 36 |
| 18495 | 50 | 0 | 37 | 1 | 37 |
| 19263 | 768 | 4 | 41 | −4 | 33 |
| 19313 | 50 | 0 | 41 | 8 | 41 |
| 19903 | 590 | −4 | 37 | −8 | 33 |
| 19953 | 50 | 0 | 37 | 4 | 37 |
| 20080 | 127 | 1 | 38 | −1 | 36 |
| 20130 | 50 | 0 | 38 | 2 | 38 |
| 20379 | 249 | −1 | 37 | −2 | 36 |
| 20429 | 50 | 0 | 37 | 1 | 37 |
| 21135 | 706 | 4 | 41 | −4 | 33 |
| 21185 | 50 | 0 | 41 | 8 | 41 |
| 21576 | 391 | −4 | 37 | −8 | 33 |
| 21626 | 50 | 0 | 37 | 4 | 37 |
| 21828 | 202 | 1 | 38 | −1 | 36 |
| 21878 | 50 | 0 | 38 | 2 | 38 |
| 22269 | 391 | −1 | 37 | −2 | 36 |
| 22319 | 50 | 0 | 37 | 1 | 37 |
| 23024 | 705 | 4 | 41 | −4 | 33 |
| 23074 | 50 | 0 | 41 | 8 | 41 |
| 23324 | 250 | −4 | 37 | −8 | 33 |
| 23374 | 50 | 0 | 37 | 4 | 37 |
| 23500 | 126 | 1 | 38 | −1 | 36 |
| 23550 | 50 | 0 | 38 | 2 | 38 |
| 24141 | 591 | −1 | 37 | −2 | 36 |
| 24191 | 50 | 0 | 37 | 1 | 37 |
| 24958 | 767 | 4 | 41 | −4 | 33 |
| 25008 | 50 | 0 | 41 | 8 | 41 |
| 25133 | 125 | 1 | 42 | −1 | 40 |
| 25181 | 48 | −4 | 38 | −6 | 34 |
| 25231 | 50 | 0 | 38 | 4 | 38 |
| 26042 | 811 | −1 | 37 | −2 | 36 |
| 26092 | 50 | 0 | 37 | 1 | 37 |
| 26903 | 811 | −16 | 21 | −32 | 5 |
| 26951 | 48 | 1 | 22 | 15 | 20 |
| 27001 | 50 | 0 | 22 | 2 | 22 |
| 27126 | 125 | 16 | 38 | −16 | 6 |
| 27176 | 50 | 0 | 38 | 32 | 38 |
| 27943 | 767 | −1 | 37 | −2 | 36 |
| 27993 | 50 | 0 | 37 | 1 | 37 |
| 28584 | 591 | 1 | 38 | −1 | 36 |
| 28634 | 50 | 0 | 38 | 2 | 38 |
| 28760 | 126 | −16 | 22 | −32 | 6 |
| 28810 | 50 | 0 | 22 | 16 | 22 |
| 29060 | 250 | 16 | 38 | −16 | 6 |
| 29110 | 50 | 0 | 38 | 32 | 38 |
| 29815 | 705 | −1 | 37 | −2 | 36 |
| 29865 | 50 | 0 | 37 | 1 | 37 |
| 30256 | 391 | 1 | 38 | −1 | 36 |
| 30306 | 50 | 0 | 38 | 2 | 38 |
| 30508 | 202 | −16 | 22 | −32 | 6 |
| 30558 | 50 | 0 | 22 | 16 | 22 |
| 30949 | 391 | 16 | 38 | −16 | 6 |
| 30999 | 50 | 0 | 38 | 32 | 38 |
| 31705 | 706 | −1 | 37 | −2 | 36 |
| 31755 | 50 | 0 | 37 | 1 | 37 |
| 32004 | 249 | 1 | 38 | −1 | 36 |
| 32054 | 50 | 0 | 38 | 2 | 38 |
| 32181 | 127 | −16 | 22 | −32 | 6 |
| 32231 | 50 | 0 | 22 | 16 | 22 |
| 32821 | 590 | 16 | 38 | −16 | 6 |
| 32871 | 50 | 0 | 38 | 32 | 38 |
| 33639 | 768 | −1 | 37 | −2 | 36 |
| 33689 | 50 | 0 | 37 | 1 | 37 |
| 33814 | 125 | −16 | 21 | −32 | 5 |
| 33862 | 46 | 1 | 22 | 15 | 20 |
| 33912 | 50 | 0 | 22 | 2 | 22 |
| 34722 | 810 | 16 | 38 | −16 | 6 |
| 34772 | 50 | 0 | 38 | 32 | 38 |
| 35583 | 811 | 4 | 42 | −4 | 34 |
| 35631 | 48 | −16 | 26 | −24 | 10 |
| 35681 | 50 | 0 | 26 | 16 | 26 |
| 35806 | 125 | −4 | 22 | −8 | 18 |
| 35856 | 50 | 0 | 22 | 4 | 22 |
| 38624 | 768 | 16 | 38 | −16 | 6 |
| 36674 | 50 | 0 | 38 | 32 | 38 |
| 37264 | 590 | −16 | 22 | −32 | 6 |
| 37314 | 50 | 0 | 22 | 16 | 22 |
| 37441 | 127 | 4 | 26 | −4 | 18 |
| 37491 | 50 | 0 | 26 | 8 | 26 |
| 37740 | 249 | −4 | 22 | −8 | 18 |
| 37790 | 50 | 0 | 22 | 4 | 22 |
| 38496 | 706 | 16 | 38 | −16 | 6 |

TABLE 3-continued

| DT | Change in DT | DW with no delay | Change in DW | DW |
|---|---|---|---|---|
| 38546 | 50 | 0 | 38 | 32 | 38 |
| 38937 | 391 | −16 | 22 | −32 | 6 |
| 38987 | 50 | 0 | 22 | 16 | 22 |
| 39189 | 202 | 4 | 26 | −4 | 18 |
| 39239 | 50 | 0 | 26 | 8 | 26 |
| 39630 | 391 | −4 | 22 | −8 | 18 |
| 39680 | 50 | 0 | 22 | 4 | 22 |
| 40385 | 705 | 16 | 38 | −16 | 6 |
| 40435 | 50 | 0 | 38 | 32 | 38 |
| 40685 | 250 | −16 | 22 | −32 | 6 |
| 40735 | 50 | 0 | 22 | 16 | 22 |
| 40861 | 126 | 4 | 26 | −4 | 18 |
| 40911 | 50 | 0 | 26 | 8 | 26 |
| 41502 | 591 | −4 | 22 | −8 | 18 |
| 41552 | 50 | 0 | 22 | 4 | 22 |
| 42319 | 767 | 16 | 38 | −16 | 6 |
| 42369 | 50 | 0 | 38 | 32 | 38 |
| 42494 | 125 | 4 | 42 | −4 | 34 |
| 42542 | 48 | −16 | 26 | −24 | 10 |
| 42592 | 50 | 0 | 26 | 16 | 26 |
| 43403 | 811 | −4 | 22 | −8 | 18 |
| 43453 | 50 | 0 | 22 | 4 | 22 |
| 44264 | 811 | −1 | 21 | −2 | 20 |
| 44312 | 48 | 4 | 25 | −3 | 17 |
| 44362 | 50 | 0 | 25 | 8 | 25 |
| 44487 | 125 | 1 | 26 | −1 | 24 |
| 44537 | 50 | 0 | 26 | 2 | 26 |
| 45304 | 767 | −4 | 22 | −8 | 18 |
| 45354 | 50 | 0 | 22 | 4 | 22 |
| 45945 | 591 | 4 | 26 | −4 | 18 |
| 45995 | 50 | 0 | 26 | 8 | 26 |
| 46121 | 126 | −1 | 25 | −2 | 24 |
| 46171 | 50 | 0 | 25 | 1 | 25 |
| 46421 | 250 | 1 | 26 | −1 | 24 |
| 46471 | 50 | 0 | 26 | 2 | 26 |
| 47716 | 705 | −4 | 22 | −8 | 18 |
| 47226 | 50 | 0 | 22 | 4 | 22 |
| 47617 | 391 | 4 | 26 | −4 | 18 |
| 47667 | 50 | 0 | 26 | 8 | 26 |
| 47869 | 202 | −1 | 25 | −2 | 24 |
| 47919 | 50 | 0 | 25 | 1 | 25 |
| 48310 | 391 | 1 | 26 | −1 | 24 |
| 48360 | 50 | 0 | 26 | 2 | 26 |
| 49066 | 706 | −4 | 22 | −8 | 18 |
| 49116 | 50 | 0 | 22 | 4 | 22 |
| 49365 | 249 | 4 | 26 | −4 | 18 |
| 49415 | 50 | 0 | 26 | 8 | 26 |
| 49542 | 127 | −1 | 25 | −2 | 24 |
| 49592 | 50 | 0 | 25 | 1 | 25 |
| 50182 | 590 | 1 | 26 | −1 | 24 |
| 50232 | 50 | 0 | 26 | 2 | 26 |
| 51000 | 768 | −4 | 22 | −8 | 18 |
| 51050 | 50 | 0 | 22 | 4 | 22 |
| 51175 | 125 | −1 | 21 | −2 | 20 |
| 51223 | 48 | 4 | 25 | −3 | 17 |
| 51273 | 50 | 0 | 25 | 8 | 25 |
| 52083 | 810 | 1 | 26 | −1 | 24 |
|  |  | 0 | 26 | 2 | 26 |

Note: All values are shown in decimal notation.

What is claimed is:

1. A pulsewidth modulation (PWM) controller for operating an inverter, said controller comprising:
   memory means for storing a plurality of drive data words representing a pulsewidth modulation sequence, each drive data word comprising a driveword and a drivetime word, said drivewords being used to operate said inverter;
   first digital means for selectively retrieving each of said plurality of drive data words from said memory means according to said pulsewidth modulation sequence in response to a next drive data word request signal; and
   second digital means governed by said drivetime word for generating said next drive data word request signal.

2. The PWM controller of claim 1, wherein said pulsewidth modulation sequence comprises an harmonic elimination pulsewidth modulation sequence.

3. The PWM controller of claim 1, wherein said inverter is a three-phase full-bridge inverter.

4. The PWM controller of claim 1, said memory means having stored therein another plurality of drive data words representing another pulsewidth modulation sequence, and said controller further comprising means for selecting which of said pluralities of drive data words are accessed by said first and second digital means.

5. The PWM controller of claim 1, wherein said first digital means comprises an address counter governed by the next drive data word request signal to generate an output used to access the drive data word from said memory means, said next drive data word request signal being operative to alter the output of said address counter.

6. The PWM controller of claim 5, wherein said second digital means comprises a comparator means for comparing a drivetime word in one of said selectively retrieved drive data words to a cycle reference time to generate said next drive data word request signal.

7. The PWM controller of claim 6, wherein said second digital means further comprises counter means for providing said cycle reference time.

8. The PWM controller of claim 5, wherein said pulsewidth modulation sequence comprises an harmonic elimination pulsewidth modulation sequence.

9. The PWM controller of claim 5, wherein said inverter is a three-phase full-bridge inverter.

10. The PWM controller of claim 5, said memory means having stored therein another plurality of drive data words representing another pulsewidth modulation sequence, and said controller further comprising means for selecting which of said pluralities of drive data words are accessed by said first and second digital means.

11. The PWM controller of claim 1, said first digital means comprising a microprocessor for retrieving said drive data words from said memory means in response to said next drive data word request signal.

12. The PWM controller of claim 11, wherein aid next drive data word request signal provides an interrupt to said microprocessor.

13. The PWM controller of claim 12, wherein said microprocessor in the absence of said interrupt performs computational tasks relating to other independent functions.

14. The PWM controller of claim 11, said first digital means comprising driveword register means and drivetime register means for respectively storing temporarily said driveword and drivetime word in each of said selectively retrieved drive data words.

15. The PWM controller of claim 14, wherein said second digital means comprises a comparator means for comparing a drivetime word stored in said drivetime register means to a cycle reference time to generate said next drive data word request signal.

16. The PWM controller of claim 15, wherein said second digital means further comprises counter means for providing said cycle reference time.

17. The PWM controller of claim 11, wherein said pulsewidth modulation sequence comprises an harmonic elimination pulsewidth modulation sequence.

18. The PWM controller of claim 11, wherein said inverter is a three-phase full-bridge inverter.

19. The PWM controller of claim 11, said memory means having stored therein another plurality of drive data words representing another pulsewidth modulation sequence, and said controller further comprising means for selecting which of said pluralities of drive data words are accessed by said first and second digital means.

20. The PWM controller of claim 1, said plurality of drive data words comprising drive data words for effecting zero-voltage switching in said inverter.

21. The PWM controller of claim 20, said inverter being a three-phase full-bridge inverter.

22. The PWM controller of claim 1, said plurality of drive data words comprising drive data words for effecting a delay having a predetermined minimum duration between said selective retrieval of each of said drive data words.

23. The PWM controller of claim 1, said plurality of drive data words comprising at least one drive data word for altering concurrently a state of a plurality of switches in said inverter.

24. An energy conversion system, comprising a pulsewidth modulation (PWM) controller for operating an inverter said controller comprising:
memory means for storing a plurality of drive data words representing a pulsewidth modulation sequence, each drive data word comprising a driveword and a drivetime word, said drivewords being used to operate said inverter;
first digital means for selectively retrieving each of said plurality of drive data words from said memory means according to said pulsewidth modulation sequence in response to a next drive data word request signal; and
second digital means governed by said drivetime word for generating said next drive data word request signal;
said system further comprising an AC source, rectifier means for rectifying the output of said AC source, and said rectified output serving as a DC voltage input to said inverter.

25. The system of claim 24, wherein said AC source comprises a turbine generator.

26. The system of claim 24, wherein said inverter is a three-phase full-bridge inverter.

27. A synchronization system, comprising:
a pulsewidth modulation (PWM) controller for operating an inverter for providing power to a load, said controller including
memory means for storing at least a first plurality and a second plurality of drive dam words, each plurality representing a pulsewidth modulation sequence which effects a different output of said inverter;
means for retrieving said drive data words from said memory means to said inverter;
means for sensing a phase characteristic of the power delivered to said load relative to the output of the inverter; and
means governed by said means for sensing for selecting which of said pluralities of drive dam words are accessed by said means for retrieving.

28. A synchronization system according to claim 27,
each drive data word comprising a driveword and a drivetime word, said drivewords being used to operate said inverter; and
said means for retrieving comprising first digital means for selectively retrieving each of said plurality of drive data words from said memory means according to said selected pulsewidth modulation sequence in response to a next drive data word request signal; and second digital means governed by said drivetime word for generating said next drive data word request signal.

29. A method for providing pulsewidth modulated (PWM) control to an inverter using a plurality of drive data words stored in memory which represent a PWM sequence, each drive data word comprising a driveword and a drivetime word, said method comprising the steps of:
selectively retrieving a first of said drive data words from said memory and providing a gating signal to said inverter as a function of said driveword included therein;
comparing said drivetime included in said first of said drive data words with a cycle reference time; and
based on said comparing step, selectively retrieving a second of said drive data words from said memory and providing a different gating signal to said inverter as a function of said driveword included therein.

30. A regulator system, comprising:
a pulsewidth modulation (PWM) controller for operating an inverter to provide power to a lead, said controller including
memory means for Storing at least a first plurality and a second plurality of drive data words, each plurality representing a pulsewidth modulation sequence which effects a different output of said inverter;
means for retrieving said drive dam words from said memory means to operate said inverter;
means for sensing a characteristic of the power delivered to said load;
means governed by said means for sensing for selecting which of said pluralities of drive data words are accessed by said means for retrieving; and
wherein said inverter comprises at least one switch and each Of said drive data words comprises a driveword representing a desired state of said at least one switch, and a drivetime word representative of a time when a switch in said inverter is to change state.

31. A regulator system according to claim 30,
said means for retrieving comprising first digital means for selectively retrieving each of said plurality of drive data words from said memory means according to said selected pulsewidth modulation sequence in response to a next drive data word request signal; and second digital means governed by said drivetime word for generating said next drive dam word request signal; and wherein said means for sensing comprise feedback means for indicating at least one of a current and voltage delivered to said load by said inverter.

32. A regulator system according to claim 31, said means for selecting comprising an offset counter which provides address information to said memory means.

33. A regulator system according to claim 30,
said means for retrieving comprising first digital means for selectively retrieving each of said plurality of drive data words from said memory means according to said selected pulsewidth modulation sequence in response to a next drive data word request signal; and second digital means governed by said drivetime word for generating: said next drive data word request signal; and said system further comprising an AC source, rectifier means for rectifying the output of said AC source, said rectified output serving as a DC voltage input to said inverter, and wherein said means for sensing comprise feedback means for indicating at least one of a current and voltage delivered to said load by said inverter.

* * * * *